Inventor
Joseph A. Denton

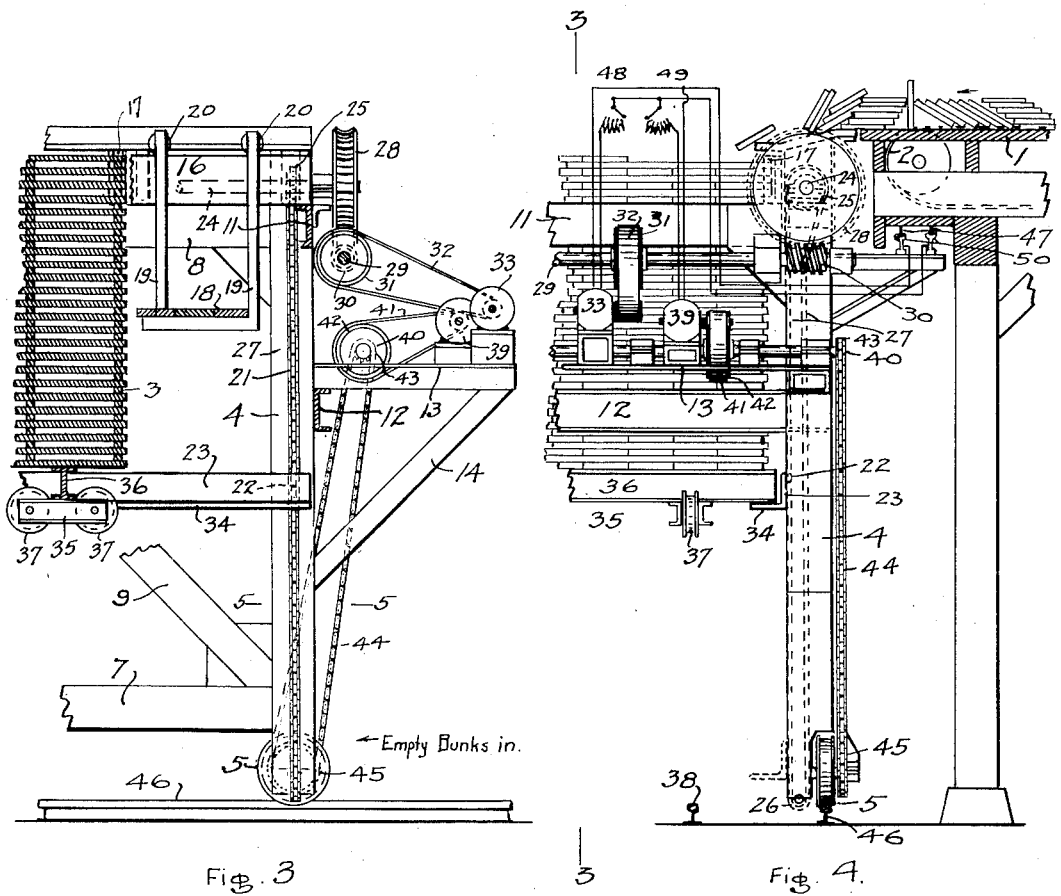
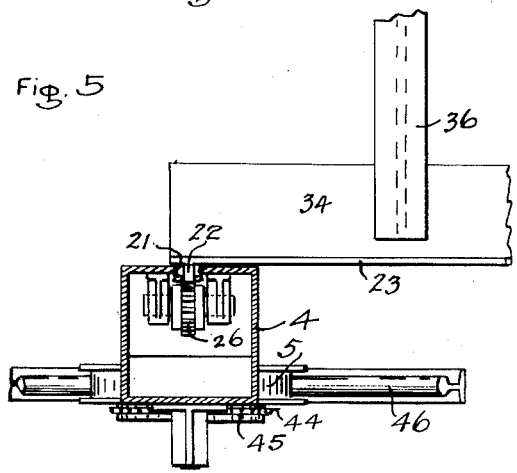
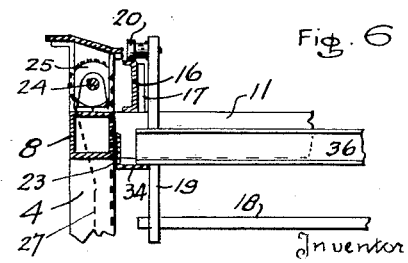

Patented July 18, 1933

1,918,800

UNITED STATES PATENT OFFICE

JOSEPH A. DENTON, OF MILWAUKEE, WISCONSIN

MOVABLE LUMBER STACKER

Application filed October 12, 1929, Serial No. 399,340. Renewed July 13, 1931.

My invention relates to machines for handling lumber and especially to machines for stacking the lumber produced by a mill. The objects of my invention are to produce a lumber stacker which is transportable from place to place in a mill, thereby eliminating the necessity of providing separate stackers at each of the several points in a mill where lumber of different dimensions are accumulated, or of transporting the lumber from such accumulating points to a common stacker; to enable the stacker to be used to make stacks of lumber of different lengths; to provide a stacker which can carry and transport a stack from the place where the stack is formed to another place, such as a transfer track; and to provide a stacker which may form a partial stack and then remove itself away from said partial stack and permit it to be transferred to suitable storage, whereby when green lumber of a certain size is produced very slowly by the mill, such lumber may be stacked daily and thereby a large percentage of such lumber may be saved from the discoloration and deterioration common when green lumber is piled without proper ventilation around each piece, and which may add to or complete such a partial stack, whenever desired.

I attain these and other objects by the devices, mechanisms and arrangements illustrated in the accompanying drawings, in which—

Figure 1:
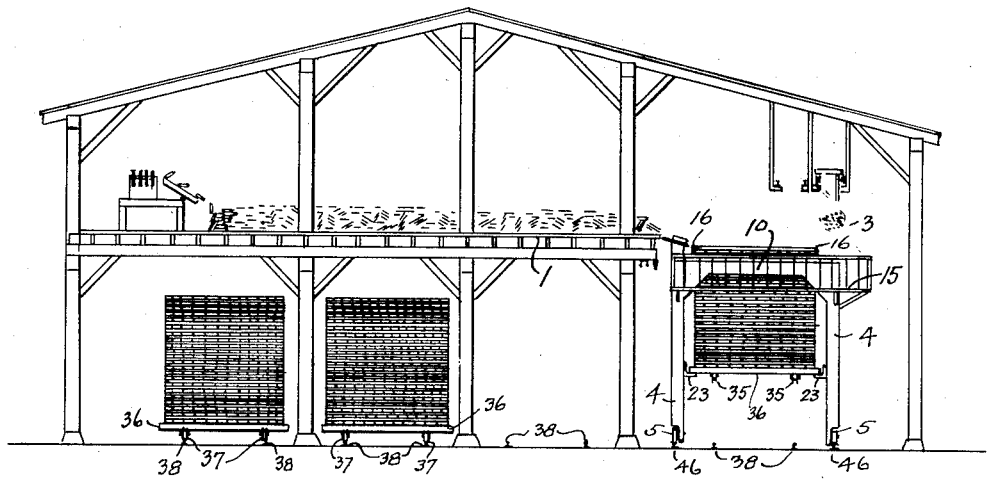
Figure 2:
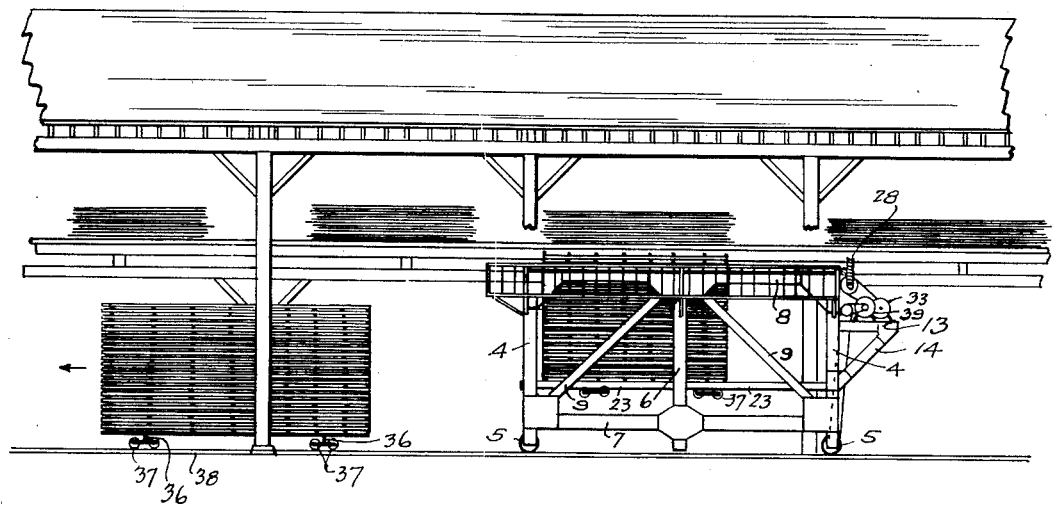

Fig. 1 is an end elevation of a stacker-storage building of a lumber mill, the end wall of the building being removed, showing one of my improved stackers being used to form a stack and showing two lumber stacks in storage; Fig. 2 is a side elevation of such a building, showing one of my improved stackers in use in one bay of the building and showing lumber of different dimensions piled at the other bays and awaiting the stacker; Fig. 3 is a cross-section of the rear end of my improved stacker, taken on the line 3—3 in Fig. 4; Fig. 4 is a rear elevation of the right-hand side of my improved stacker, showing also the wiring for the operating motors in diagrammatic form; Fig. 5 is a horizontal section of one of the rear legs of my improved stacker, taken on the line 5—5 in Fig. 3; and Fig. 6 is a cross-section of a part of the upper portion of the stacker, showing particularly the adjustable working platform therein.

Similar numerals of reference refer to similar parts throughout the several views.

The lumber produced in a mill is delivered by an automatic sorter to the successive several positions where all the lumber of the same dimensions is collected. The lumber of any one dimension drops to the collecting floor 1 and piles to a depth of, it may be, several feet on top of a lateral conveyor 2. This conveyor 2 is operated intermittently to move this pile of lumber away from the sorter and nearer to the outer edge of the collecting floor 1, thus making room for more lumber to fall from the sorter on to the floor. In this manner lumber is collected at the several bays of the floor 1, all of the lumber in any one bay being of the same dimensions. The collecting floor 1 and the conveyor, on which this lumber is thus collected, may be of sufficient size so that, when the collecting floor 1 is full, the amount of lumber thereon corresponds with one stack. As shown in the drawings, this collecting floor 1 is raised to a height of about fourteen feet above the surface of the ground, and its outer edge is open and overhangs the supporting posts to provide free space between the supporting posts and the legs of my improved stacker.

My improved stacker is so constructed to be movable on a track along the open edge of the said collecting floor 1, said track being parallel to the said open edge of the floor 1, from one bay to another, thus permitting a single stacker to operate on any pile along the entire length of said collecting floor.

My improved stacker comprises a frame formed of six vertical legs, three of which are on each side of the frame, the four corner legs 4 being provided with suitable double-flanged wheels 5, as hereinafter described, while the two central legs 6 are not supported from below; a lower longitudinal beam 7, on each side of the frame, secures the lower ends of the three legs 4 and 6 together; an upper horizontal beam 8, on each side of the frame, secures the upper ends of said three legs 4 and 6 together; diagonal bars 9 run from the ends of the lower beams 7 to the center of the upper beams 8, and brace the sides of the frame; a front end cross-beam 10, joining the upper ends of the two front legs 4, at an elevation well above the top of a stack and slightly lower than that of the collecting floor 1; an upper rear cross-beam 11 joins the upper ends of the two rear legs 4, at a level corresponding with the other upper beams of the frame; and a lower rear cross-beam 12 joins the said two rear legs 4 at a point more than one-half way up the said legs.

The frame, thus formed, is also provided with a rear motor-platform 13, mounted on the lower rear cross-beam 12 and extending to the rear of the frame. This platform 13 is suitably braced, to the rear of the legs 4, by brackets 14, and is adapted to support the several electric motors and other mechanisms mounted thereon, whereby the stacker is operated and transported, as hereinafter described.

A fixed work-platform 15 extends across the front of the frame and along the left or outer side thereof, on the outside of the frame, and is positioned at such elevation as to permit the workmen thereon to work over the front cross-beam 10 and the upper side-beam 8 to lay the lumber on the top of the descending stack as well as to lay the cross-strips 3 thereon.

Two supplemental beams 16 are secured in longitudinal position on top of the front and rear upper cross-beams 10 and 11, being spaced slightly inward from the upper longitudinal side-beams 8, respectively. Each such supplemental beam 16 is provided with spaced guides 17 adapted to guide the cross-strips 3 so that the said cross-strips will be placed one above the other in the stack.

Also an adjustable work-platform 18 (Fig. 6) is hung by means of straps 19 from the upper side of the said supplemental beams 16, between the sides of the frame and forward of the rear cross-beam 11, and to the rear of the stack being formed. The straps 19 are provided with rollers 20 whereby the platform 18 may be moved to any position forward of its rearmost position in order to enable the workmen thereon to reach the lumber forming the stack when such lumber is shorter than the longest length which the stacker is adapted to work on, thereby adapting the stacker to operate on the lumber in any one of the several bays where the lumber is accumulated for the stacks. Since this platform 18 is hung inside of the supplemental beams 16, and since said beams 16 are positioned inside of the main frame members, a sufficient space is left between the legs 4 and 6 of the frame and the straps 19 to permit the hereinafter described lifting-beam 23 to pass upward between the frame and the platform 18.

Each of the legs 4 and 6 is formed with a vertical slot 21 on its inner side, extending its entire length and adapted to receive and guide the lug 22 on the lifting-beam 23, hereinafter described.

An operating shaft 24 is mounted in suitable bearings above each side-beam 8 of the frame, and is provided with three sprocket wheels 25 thereon, each sprocket wheel 25 being positioned over a slot 21 of the several legs 4 and 6. Suitable idler sprocket wheels 26 are mounted at the lower ends of the several legs 4 and 6 in line with the several sprocket wheels 25. Sprocket chains 27 are fastened to the side lugs 22, above mentioned, and pass over the upper sprocket wheels 25 of the operating shaft 24 and down the inside of the legs 4 and 6 and around the lower idler sprocket wheels 26 and back to the said guide lug 22. Each of the two above-described shafts 24 are provided with a large worm wheel 28 on their rear ends. A driving shaft 29 is mounted, in suitable bearings, across the rear end of the stacker frame and is provided with worms 30 at its ends. The worms 30 mesh with and drive the two said worm wheels 28. The said worms 30 are provided with helical teeth cut in opposite senses, the one being right-hand worm and the other a left-hand worm. This cross drive-shaft 29 is provided with a suitable driving means, comprising a pulley 31 mounted thereon and a link-belt 32, or other suitable connection with the reversible electric motor 33, mounted on the above described rear motor-platform 13 of the frame. The two operating shafts 24, together with the three sprocket wheels 25 on each such shaft 24, are therefore operated equally and simultaneously in opposite directions, so that when the motor 33 turns in a certain direction, the guide lugs 22 will all be equally raised or lowered as the case may be. The sprocket chains 27 are so arranged that all the guide lugs 22 are in exactly the same position at all times.

Each guide lug 22 is secured to, or forms a part of, one of the two long lifting-beams 23, and therefore, when the said motor 33 is operated the said lifting-beams 23 are equally and simultaneously raised or lowered. There are two of these lifting-beams 23, each being long enough to engage all three legs 4 and 6 of one side of the frame, and each is preferably formed of a heavy angle iron, having its lower leg 34 projecting inward from the frame and having its vertical leg lying against the inner surface of said frame legs 4 and 6.

The kiln-trucks 35 are formed of an I-beam 36 which is of such length as to extend across the frame and over the said horizontal leg 34 of the lifting-beam 23, and to rest thereon. Each such I-beam 36 is provided with two pairs of alined double-flanged wheels 37.

When a stack is to be formed, several kiln-trucks 35 on which it is to be piled, are run under the stacker, from the rear thereof, and are placed in proper position therein to receive the stack. The ends of said kiln-truck I-beams 36 extend over the flanges 34 of the two lifting-beams 23. The said beams 23 are then raised, with the kiln-trucks 35 extending between them, by operating the motor 33, as above-described, to their uppermost position immediately under the supplemental beams 16. The operators then take the lumber from the collecting floor 1, piece by piece, and place it on the kiln-trucks thus elevated. When one layer of boards have thus been laid on the I-beams 36, the workman then place a series of cross-strips 3 on top of this layer of lumber; they then place a second layer of lumber on these strips. This action is continued until the layers reach the level of the collecting floor 1, the strips 3 therein thus separating each layer of the lumber from those above and below it. When sufficient of this lumber has been thus piled on the trucks to bring the pile to about the level of the floor 1, the operator then actuates the motor 33 and the trucks 35 are lowered a foot or so and the process of building up the stack thereon is continued so that, by the time the lifting-beams 23 have been lowered to within a short distance of the ground, all the lumber for that stack has been transferred from the collecting floor 1 to the stack, and the stack has been completed. When the stack has thus been completed the lifting-beams 23 are completely lowered to release the I-beams 36 from contact therewith. The wheels 37 of the kiln-trucks then rest on the rails 38, forming the track, and the stack may then be rolled out from under the stacker and transferred to the dry-kiln or to storage.

A second electric motor 39 is mounted on the motor platform 13 and operates a cross-shaft 40 by means of a suitable belt 41 and pulley 42, or by other suitable means. This cross-shaft 40 is mounted in suitable bearings and is provided, at each end, with sprocket wheels 43 over which the two sprocket chains 44 pass. These chains 44 extend down therefrom and around the two sprocket wheels 45, which are mounted on the outer sides of the two rear wheels 5 of the stacker. Thus, by operating this second motor 39, the rear wheels 5 of the stacker are turned and the stacker is transported on its track, formed of the two rails 46, to another bay and may then be used to form a new stack of the lumber accumulated in the said bay.

It will be noted that the two above-described tracks 38 and 46 are concentric, the inner pair of rails 38 being adapted to carry the several stacks to the dry-kiln or to storage, while the outer pair of rails 46 are adapted to carry the stacker to any position in front of the collecting floor 1.

The two motors 33 and 39 are operated from the control boards positioned on the front work-platform 15. A pair of electrically energized bare trolley wires 47 are suitably mounted under the outer overhanging edge of the collecting floor 1, and the electric energy thereof is conveyed to the respective motors 33 and 39 through the controllers, indicated diagrammatically at 48 and 49 by means of the pair of trolley wheels or shoes 50, suitably mounted on the side of the frame of the stacker adjacent to the said collecting floor 1.

It will, of course, be understood that many changes may be made in the details of my improved movable lumber stacker, without departing from its main idea, such as substituting some other system of connecting either or both of the motors with the parts driven thereby, or providing a single motor to drive either or both mechanisms through suitable clutching apparatus.

It is evident that if there is insufficient lumber at any bay of the floor 1 to make a complete stack, a partial stack may be made and lowered to the ground and the stacker may then be moved to another bay to form a stack of some other pile of lumber, the said partial stack being placed in suitable reserve storage until more lumber of that particular dimension has been collected, whereupon, the stacker and the partial stack are returned to the bay, the stack being run into place under the stacker which then lifts the stack to bring its top above the stacker frame, and the stacking of the lumber thereon is continued.

Also, it is evident that the entire stack, with its kiln-trucks, may be transported to any desired place, as a transfer track, by the stacker, before it is lowered to its track, thus the stacker may also be used as a transporter or carrier for the completed or uncompleted stack.

What I claim as my invention, and desire to secure by Letters Patent, is:—

1. In a movable lumber stacker, the combination of a frame comprising four supporting legs, mounted on wheels and carrying an elevated horizontal frame at their upper ends, said horizontal frame being above the level of the top of the stack to be formed, each of said legs having a vertical slot extending down its inner side; two opposed horizontal parallel lifting beams, each mounted in said slots in the adjacent legs and extending longitudinally between the two legs forming a side of the frame, and having an inward-extending flange; a driven shaft, mounted across the end of the frame; two parallel horizontal shafts operatively connected to said driven shaft and mounted in the upper ends of said legs; sprocket means comprising gears mounted on said shafts, in the upper ends of said legs, idler gears mounted in the lower ends of said legs, and endless chains looped around said gears and lying in said legs; corresponding connections between said chains and said beams of such a character that said beams are supported at corresponding levels in vertical adjustment in said slots by the tension in said chains; and a plurality of lumber trucks, each extending across said stacker and supported at its ends by said lifting beams and adapted to be raised by said beams to receive the lumber to be stacked thereon.

2. A lumber stacking and transporting apparatus for use with the bays of an automatic lumber sorter and comprising means extending along the bays for transporting piles of lumber from any of the bays to another point, a track having rails disposed along the outside of said means, a lumber stacker including a wheeled frame riding on said rails and straddling said means, and mechanism cooperable with said means, carried by the frame of the stacker and vertically movable relative thereto and designed and adapted to provide for the building up of the stack of lumber thereon, the supporting of the complete stack and the delivery of the completed stack to any desired point of deposit within the operating range of said means.

3. A lumber stacking and transporting apparatus for use with the bays of an automatic lumber sorter and comprising means extending along the bays for transporting piles of lumber from any of the bays to another point, a track having rails disposed along the outside of said means, a lumber stacker including a wheeled frame riding on said rails, said frame straddling said means, vertically adjustable members cooperable with said means, carried by said frame and providing a support for a stack of lumber and also providing for the delivery of the stack of lumber to any desired point of deposit within the operating range of said means, and means for adjusting said members.

4. A lumber stacking and transporting apparatus for use with the bays of an automatic sorter and comprising inner and outer tracks paralleling said bays, a plurality of wheeled inner trucks riding on said inner track and positionable in alinement with any of said bays, a wheeled lumber stacker riding on said outer track and having a frame straddling said inner track and said lumber trucks whereby the stacker may be moved over and past any of said trucks or moved into position wherein selected trucks are within the operative range of the stacker, and means carried by the stacker and engageable with selected trucks for raising and lowering the same.

5. A lumber stacking and transporting apparatus for use with the bays of an automatic sorter and comprising a plurality of mobile lumber trucks adapted to be positioned adjacent any of said bays, a movable lumber stacker, means supporting said lumber stacker for movement along said bays, said lumber stacker straddling said trucks whereby it may be moved over and past the same or into position where selected trucks are within the confines of the stacker, and means carried by the stacker and cooperable with any selected transfer trucks for raising and lowering the same, said transfer trucks when fully raised being positioned adjacent the level of the bay with which the stacker is alined and being adapted to be appropriately lowered as the stack is built up thereon.

6. In combination with a plurality of mobile lumber trucks, a movable stacker adapted to straddle said trucks and to be moved over and past any of said trucks or moved into position wherein selected trucks are within the operating range of the stacker and motor driven means carried by the stacker and engageable with any selected number of said trucks for raising and lowering the same.

7. A lumber stacking and transporting apparatus for use with the bays of an automatic lumber sorter and also for stacking pieces sorted by hand and comprising means extending along the bays for transporting piles of lumber from any of the bays to another point, a track having rails disposed along the outside of said means and also extending to the point at which the hand sorted pieces are located, a lumber stacker including a wheeled frame riding on said rails and straddling said means, vertically adjustable members cooperable with said means carried by said frame and providing for the building up of the stack, the supporting of a complete stack and the delivery of the stack to any desired point of deposit within the operating range of said means, and means for adjusting said members.

8. A lumber stacking and transporting apparatus for use with the bays of an automatic lumber sorter and comprising means extending along the bays for transporting piles of lumber from any of the bays to another point, a lumber stacker including a wheeled frame straddling said means, there being ways along the sides of said means along which the wheeled lumber stacker travels and mechanism cooperable with said means, carried by the frame of the stacker and vertically movable relative thereto and designed and adapted to provide for the building up of a stack of lumber thereon, the supporting of a complete stack and the delivery of the stack to any desired point of deposit within the operating range of said means.

9. A lumber stacking and transporting apparatus for use with the bays of an automatic lumber sorter and comprising means providing a way extending along the bays and along which the piles of stacked lumber may travel from any one of the bays to another point, a track having rails disposed along the outside of said way, a plurality of lumber supports movable along said way, a lumber stacker including a wheeled frame riding on said rails and straddling said way and said supports, said straddle frame being designed to be moved over and past any of said lumber supports or into position wherein selected supports are within the confines of the frame, and mechanism carried by the frame of the stacker and vertically movable relative thereto and engageable with lumber supports located within the confines of the frame to raise and lower said supports for building up a stack of lumber and for depositing the supports when the stack is complete on said way.

JOSEPH A. DENTON.

CERTIFICATE OF CORRECTION.

Patent No. 1,918,800. July 18, 1933.

JOSEPH A. DENTON.

It is hereby certified that error appears in the printed specification of the above numbered patent requiring correction as follows: In the heading to the drawings of Sheets 1 and 2, for "J. A. DENTON ET AL" read "J. A. DENTON"; and that the said Letters Patent should be read with this correction therein that the same may conform to the record of the case in the Patent Office.

Signed and sealed this 15th day of August, A. D. 1933.

M. J. Moore.
(Seal) Acting Commissioner of Patents.